June 18, 1974 TEIJI UCHIDA 3,817,730

METHOD OF MAKING OPTICAL LINES IN DIELECTRIC BODY

Filed Sept. 26, 1972

INVENTOR.
TEIJI UCHIDA
BY
Sandoe, Hopgood & Calimafde
ATTORNEYS

United States Patent Office 3,817,730

Patented June 18, 1974

3,817,730

METHOD OF MAKING OPTICAL LINES IN DIELECTRIC BODY

Teiji Uchida, % Nippon Electric Company, Ltd., 7-15 Shiba Gochome, Minato-ku, Tokyo, Japan Continuation-in-part of abandoned application Ser. No. 101,743, Dec. 28, 1970. This application Sept. 26, 1972, Ser. No. 292,305

Claims priority, application Japan, Dec. 29, 1969, 45/105,247

Int. Cl. C03c *15/00*

U.S. Cl. 65—30 10 Claims

ABSTRACT OF THE DISCLOSURE

A printed optical circuit including a transparent dielectric body on which at least one elongated region is formed. A varying refractive index is established in the dielectric body by varying the relative concentration of metallic positive ions therein. A method for fabricating the optical circuit is also described.

This application is a continuation-in-part of application Ser. No. 101,743, filed Dec. 28, 1970, and now abandoned.

The present invention relates generally to optical circuits, and more particularly to the construction of a printed type optical circuit.

The field of opto-electronics, which combines light and electrical techniques, has recently been developed. While improvements in miniaturization have been achieved from the use of printed circuits to the use of integrated circuits in the field of electric circuits, the achieving of increased miniaturization has heretofore not been developed to any appreciable degree in the field of circuits employing light. There thus exists an imbalance between optical circuits and electric circuits with respect to their maufacture and the minimum size of the apparatus that can be achieved.

For instance, although an electric connection between a light signal source, such as an electro-luminescent diode, a photo-electric transducer element, such as a photo-diode, and other circuit elements can be realized relatively easily in a compact form as by a printed circuit or the like, if the optical transmission lines connected between the electroluminescent diodes and the photo diodes are formed by conventional optical fibers such as, for instance, glass fibers, it is then necessary to connect individual independent glass fibers between the respective elements. The number of operations required in this process is extremely high, and, therefore, facility of manufacture and high miniaturization cannot be expected.

A glass fiber having a refractive index distribution, where the refractive index decreases gradually from the center axis towards the periphery, is disclosed in copending application, Ser. No. 147,256, filed May 26, 1971, entitled "Fibrous Converging Light Guide Element." The focusing light propagating medium disclosed in said application (identified by the registered trade name, Selfoc) enables the realization of a rod lens having a minute aperture or a flexible lens as explained on pp. 24 and 25 of *Japan Electronic Engineering*, February 1969, and thus enables the realization of the so-called "micro-optics" effect. However, even with this focusing light propagating medium, the number of fabrication operations required to produce the desired number of conducting paths is still relatively large. In an attempt to improve the compactness of such optical circuits, an integrated compact optical circuit has been proposed by S. E. Miller in BSTJ, September 1969. That circuit, while being somewhat more compact than the previously known optical circuits, is relatively difficult to practically manufacture.

It is thus an object of the present invention to provide an improved printed optical circuit which may be more readily fabricated than optical circuits that have heretofore been known to the prior art.

The present invention in one aspect thereof provides a printed optical circuit comprising a planar transparent dielectric body containing a plurality of metallic positive ions. An elongated region or regions are provided in the dielectric body according to a desired pattern, in a manner such that the proportion or relative concentration of metallic positive ions in the body varies radially outwardly from the center axis of the body. The refractive index of the body gradually decreases from the center axis radially outwardly, the elongated region or regions thus providing an optical transmission line or lines.

In another aspect of the invention, a planar transparent body may be joined to another planar body, the proportion of positive ions in the dielectric body varying along a transverse cross-section of the dielectric body from one or more points in the proximity of the joining surface in the direction away from the joining surface. An elongated region or regions, having a cross-section in which the refractive index varies gradually from the one or more points in the direction away from the joining surface, is formed according to a desired pattern to provide an optical transmission line or lines. If desired, channels that extend on both sides of each elongated region may be provided in the optical circuit.

Another feature of the present invention is a method for making a desired pattern of optical lines in a dielectric body, such as in the fabrication of the printed optical circuit described above. That method includes the steps of preparing a planar transparent dielectric body containing at least one or more kinds of metallic positive ions, and forming a desired pattern or mask on one surface of the transparent dielectric body. A salt of positive metallic ions having a larger ionic polarizability per unit volume (or electronic polarizability/ionic radius$^3$) than the metallic positive ions contained in the dielectric body, is brought in contact with the transparent dielectric body through the mask to perform ion exchange. The mask is thereafter removed and a salt of metallic positive ions having a smaller ionic polarizability per unit volume than the metallic positive ions used in the preceding step is brought in contact with the surface of the dielectric body to carry out ion exchange. If desired, another body may then be joined onto the entire surface of the dielectric body.

The method of the present invention may also include the step of etching the part of the dielectric body exposed through the mask to a predetermined depth to form a predetermined pattern of elongated ridge portions on the surface of the dielectric body prior to the removal of the mask. A salt of metallic positive ions having a lower ionic polarizability than the metallic positive ions contained in the dielectric body, is then brought into contact with at least the surface portion corresponding to the ridge portion among the peripheral surface of the ridge portion and the surface opposite to the surface having the ridge portion to carry out ion exchange. If desired, another body may be joined to the dielectric body on the surface opposite to the surface of the dielectric body on which the ridge portion is formed.

According to the present invention, since a predetermined wiring of an optical circuit can be realized by providing a printed type of optical circuit having a predetermined wiring pattern, the wiring of a complex optical circuit may be achieved through a single step, and thereby mass production of optical circuit apparatus is available.

To the accomplishment of the above and to such further objects as may hereinafter appear, the present invention relates to a printed type of optical circuit and method for making the same, substantially as defined in the appended claims and as described in the following specification taken together with the accompanying drawings in which:

Figure 3A:
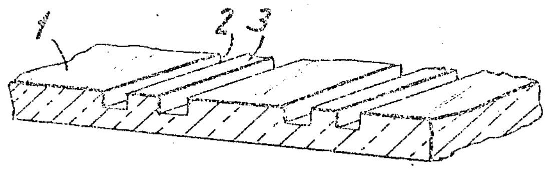
Figure 4D:
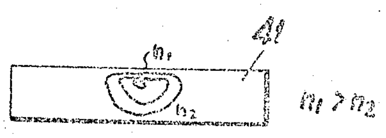
Figure 3B:
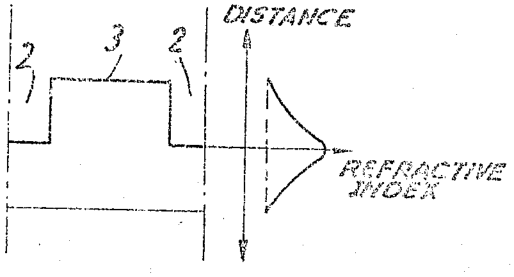

FIGS. 3*a* and 3*b* are respectively a perspective view and a diagrammatic view of a second embodiment of the invention; and FIGS. 4*a–d* and FIG. 5, respectively, show still other embodiments of optical circuits according to the present invention.

Figure 1:
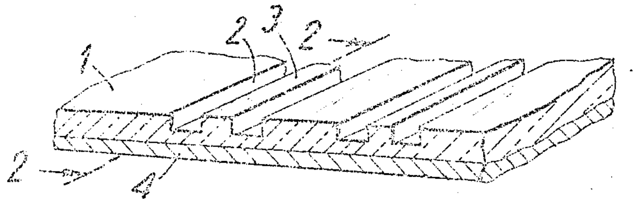
FIG. 1 is a perspective view of the essential part of an optical circuit according to a preferred embodiment of the present invention.
Figure 4A:
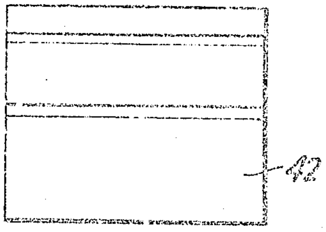
Figure 2:
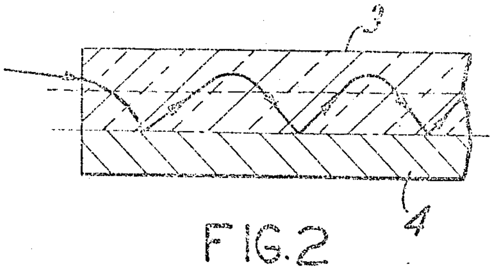
FIG. 2 is a cross-sectional view taken along line 2—2 in FIG. 1.
Figure 4B:
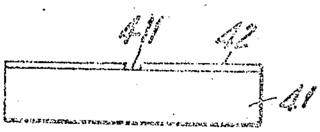
Figure 4C:
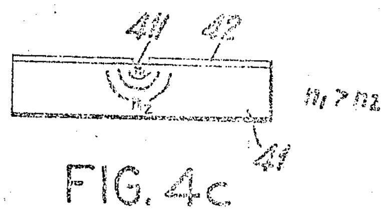

The essential part of a printed optical circuit according to the present invention, as shown in FIG. 1, comprises a glass plate 1. A pair of channels 2 are etched on the surface of glass plate 1 and define an optical line 3 according to a predetermined pattern as defined by the etched channels 2. A body 4 is joined onto the back surface of glass plate 1 and has a refractive index that is lower than that of glass plate 1. The optical line 3 is subjected to an ion exchange processing, in a manner more completely described in a later part of the application, so that its refractive index decreases from its inner portion towards its surface.

As a result, a light projected into the optical line 3 along the direction of its optical axis advances through optical line 3 while oscillating. Even if the optical line 3 is curved, the light can advance through optical line 3 along its curve.

It is known theoretically that if the refractive index of a light propagating body decreases from its center axis towards its periphery, then the light advancing in that body will be confined to within the light propagating body, and will follow an optical line oscillating around the optical axis of the light propagating body. (For instance, reference is made to an article by S. E. Miller published in *The Bell System Technical Journal*, November *1965*.) It is also known that at the boundary between two bodies having different refractive indices, light coming through one of the bodies is reflected at the incident point to the other body.

Therefore, the light projected into optical line 3 does not escape from the surface of optical line 3 as a result of the established refractive index gradient, and does not escape from the bottom of the optical line as a result of the reflection at the contact surface of optical line 3 with body 4. Accordingly, the light incident on optical line 3 advances along that line.

Therefore, optical line 3, provided in a predetermined pattern, can be utilized to optically connect between optical elements provided at the incident and emitting ends of the line, respectively. In other words, optical wiring can be achieved by the use of the optical circuit of FIG. 1. Furthermore, in the embodiment of FIG. 1, since the necessary number of optical wiring leads can be formed on a single glass plate (by the method of manufacture described below), an optical circuit providing optical connections between many optical elements can be fabricated through a single step.

In the fabrication of the optical circuit of FIG. 1, a thin glass plate 1 having a fixed refractive index and containing two or more modifying oxides is prepared. A predetermined pattern of mask (Not shown) is provided on the glass plate, and the latter is then etched by means of, for example, hydrofluoric acid. As a result of the etching, channels 2 as well as the ridge portions 3 defined by channels 2, are formed on the glass plate as illustrated in FIG. 1. The proportion of the modifying oxides in glass plate 1 is subsequently varied by carrying out an ion exchange process in ridge portions 3 from the surface of the glass plate 1. $Li_2O$, $Na_2O$, $K_2O$, $Rb_2O$, $Cs_2O$, $Tl_2O$, $Au_2O$, $Ag_2O$, $Ca_2O$, $MgO$, $CaO$, $BaO$, $ZnO$, $CdO$, $PbO$, $SnO_2$, $La_2O_3$, and the like may be employed as the modifying oxides.

Generally the refractive index of a substance is related to the molecular refraction and the molecular volume inherent to that substance. That is, the refractive index of the substance becomes larger as the molecular refraction becomes larger and as the molecular volume becomes smaller. Here the molecular refraction is proportion to the polarizability of the substance.

It is known that the molecular refraction of glass can be approximated by the sum of the individual ionic refractions. Therefore, the qualitative effect of the existence of a certain ion upon the refractive index of glass can be known by comparing the values of the electronic polarizabilities per unit volume, or the values of $$\frac{\text{Electronic polarizability}}{(\text{Ionic radius})^3}$$

of the relevant ions. Representative positive ions forming the modifying oxides, with respect to respective monovalent ions are those of lithium, sodium, potassium, rubidium, cesium, and thallium; the respective divalent ions are those of magnesium, calcium, strontium, barium, zinc, cadmium, and lead; the trivalent ion is that of lanthanum; and the tetravalent ion is that of tin. The values of the ionic radius, the electronic polarizability, and the ratio of electronic polarizability to (ionic radius)$^3$, are shown in Table 1. Since each ion has its inherent value of the ratio of electronic polarizability to (ionic radius)$^3$, a comparison can be made between the refractive index of glass containing positive ions forming the modifying oxides and the refractive index of glass of the type in which a part or whole of the positive ions has a smaller value of that ratio than that of the first positive ions. That comparison indicates that the latter refractive index is smaller than the former refractive index.

TABLE 1

| Ion | Ionic radius (A). | Electronic polarizability | Electronic polarizability (ionic radius) |
|---|---|---|---|
| $Li^+$ | 0.78 | 0.03 | 0.0632 |
| $Na^+$ | 0.95 | 0.41 | 0.478 |
| $K^+$ | 1.33 | 1.33 | 0.565 |
| $Rb^+$ | 1.49 | 1.98 | 0.599 |
| $Cs^+$ | 1.65 | 3.34 | 0.744 |
| $Tl^+$ | 1.49 | 5.2 | 1.572 |
| $Mg^{+2}$ | 0.78 | 0.094 | 0.20 |
| $Ca^{+2}$ | 0.99 | 1.1 | 1.13 |
| $Sr^{+2}$ | 1.27 | 1.6 | 0.78 |
| $Ba^{+2}$ | 1.43 | 2.5 | 0.85 |
| $Zn^{+2}$ | 0.83 | 0.8 | 1.39 |
| $Cd^{+2}$ | 1.03 | 1.8 | 1.71 |
| $Pb^{+2}$ | 1.32 | 4.7 | 2.11 |
| $La^{+3}$ | 1.22 | 1.04 | 5.63 |
| $Sn^{+4}$ | 0.74 | 3.4 | 8.35 |

Accordingly, by bringing a glass body containing certain positive ions forming the modifying oxides in contact with a salt containing other positive ions which can form a modifying oxide having a different ratio of electronic polarizability to (ionic radius)$^3$ from that of the first positive ions, it is possible to cause the first positive ions in the glass near its contact surface to be exchanged by the positive ions in the salt, and to make the refractive index of the glass decrease approaching the contact surface.

In this connection, it may be necessary to bring the glass body in contact with the salt and to heat the salt and the glass body so as to maintain them at a temperature at which the positive ions in the salt and the glass can diffuse within the glass body.

Therefore, in the fabrication of the optical device of FIG. 1, if the modifying oxide in the glass plate 1 is, for example, $Tl_2O$, then ridge portions 3 of the glass body is brought in contact with a salt of $K_2O$, and ion exchange is carried out between both of these oxides, whereby a refractive index gradient is formed in the ridge portions 3.

Body 4, having a smaller refractive index than that of said glass plate, is thereafter joined to the back surface of glass plate 1 on which the optical lines 3 are thus formed, to thereby complete the fabrication of the printed type optical circuit of FIG. 1. Body 4 need not be a refractive medium, but it is required that body 4 be able to prevent light from going out of the glass plate. Body 4 may thus be made either of silver, aluminum, gold, or the like, which forms a metallic reflective mirror surface, or of a dielectric multi-layer film, with similar properties.

In addition, bore portions may be selectively formed in the central portion of optical lines 3, if necessary, and optical elements (for instance, luminescent diodes, photoelectric elements, and the like) may be disposed in those bore portions.

It is also possible, as shown in the embodiment of the invention illustrated in FIG. 3, to establish a refractive index gradient in the portion of the glass plate near its rear surface, such that the refractive index of the glass plate decreases approaching that rear surface, by bringing the rear surface of glass plate 1 in contact with a salt containing other positive ions which can form a modifying oxide having a different ratio of electronic polarizability to (ionic radius)$^3$ from that of the positive ions forming the modifying oxide in glass plate 1 without providing body 4, and exchanging the positive ions in the portion of the glass plate near the contact surface or the back surface of the glass plate 1 by the positive ions in the salt.

According to this embodiment, since optical line 3 forms a focusing optical transmitting body having a refractive index gradient as described above in which the refractive index gradually decreases from the center axis towards the periphery, as shown in FIG. 3*b* this optical transmitting line 3 has a more excellent optical transmission characteristic than that of the first embodiment of FIG. 1.

In the fabrication of the embodiment of FIG. 3, the step of performing ion exchange from the back surface of glass plate 1 may be carried out either simultaneously with or separately from the step of performing ion exchange from the front surface of glass plate 1 to establish a desired refractive index gradient in ridge portions 3 (that is, the light transmitting lines). When both ion exchange steps are carried out simultaneously, there is an advantage that the working steps are simplified. On the other hand, when the respective working steps are carried out separately, there is another advantage that the temperature, time, and the like of the respective ion exchange steps may be separately controlled as desired.

In one practical process for fabricating the optical circuit of FIG. 3, a glass plate of about 100 microns in thickness was subjected to the photoetching process to form a ridge of about 100 microns in width and about 30 microns in height. The surface of the glass plate including the ridge is then brought into contact with a molten salt including $Tl_2SO_4$ at a temperature of approximately 500° C. for a period of about 15 hours. This resulted in the desired gradient in the refractive index distribution in the portion of the glass plate lying beneath the ridge.

FIG. 4 schematically illustrates the method for manufacturing a third embodiment of the present invention. At first, as shown in the plane and elevation views of FIGS. 4(*a*) and 4(*b*) a mask 42 (for instance, a photo-etching mask, a paraffin mask, etc.) is applied on the surface of a glass plate 41, according to the desired pattern of the optical lines to be formed on the glass plate.

Subsequently, as diagrammatically shown in FIG. 4(*c*), the proportion or concentration of the modifying oxides in glass plate 41 is made to change according to an ion exchange process from the surface of a portion 411 of glass plate 41 exposed through mask 42, to thereby form a refractive index gradient such that the refractive index decreases gradually from the surface of the exposed portion of glass plate 41 towards its inner portion. This ion exchange process is carried out according to the same principle as that described above with respect to the embodiment of FIG. 1, $LiO_2$, $Na_2O$, $K_2O$, $Rb_2O$, $Cs_2O$, $Tl_2O$, $Au_2O$, $Ag_2O$, $Ca_2O$, MgO, CaO, BaO, ZnO, CdO, PbO, $SnO_2$, $La_2O_3$, and the like, may be employed as the modifying oxides as before.

More particularly, glass plate 41 contains at least one or more kinds of oxides among the above-referred modifying oxides, and the ion exchange is carried out by bringing glass plate 41 in contact with a salt containing positive ions which can form a modifying oxide having a larger value of electronic polarizability/(ionic radius)$^3$ than the positive ions of the first modifying oxides.

Therefore, in the step illustrated in FIG. 4(*c*), if the modifying oxide in the glass plate 41 is $K_2O$, then the exposed portion 411 of glass plate 41 may be brought in contact with a salt of $Tl_2O$ to carry out ion exchange between both oxides.

Mask 42 is subsequently removed, and, thereafter the surface of glass plate 41 is brought in contact with a salt of positive ions such as, for example, $K_2O$ having a smaller value of electronic polarizability/(ionic radius) than the ions (for instance, $Tl^+$) replaced in the glass plate 41 through the preceding ion exchange step, to thereby form a refractive index gradient such that the refractive index increases from the surface of glass plate 41 towards its inner portion. As a result, the region where the refractive index gradient was previously formed changes to a region where the refractive index decreases gradually from the center region having a larger refractive index radially outwardly, as diagrammatically shown in FIG. 4(*d*).

In one practical process for fabricating the embodiment of the invention shown in FIG. 4, a glass plate having a thickness of approximately 1 mm. and coated with a metal film was subjected to photo-etching to form a desired strip of the etched-out portion of approximately 20 microns in width. The plate is then kept in contact with a molten salt containing $Tl_2SO_4$ at a temperature of approximately 500° C. for a period of 15 hours. This resulted in a gradient in the refractive index distribution that decreases radially depthwise from the center of the etched-out portion (to the extent of 30 microns in the radial direction).

After the metal film mask was subsequently removed, the glass plate was again brought into contact with another molten salt containing $KNO_2$ at a temperature of approximately 500° C. for a period of about 10 hours. This process decreased the refractive index at the etched-out portion to the extent that it becomes approximately equal to that of the glass plate, with the effect of the subsequent ion exchange decreasing toward the deeper portion of the glass plate. In this manner, the gradient in the refractive index of glass plate 41 as shown in FIG. 4(*d*) is achieved.

In this way, an optical transmission line or lines in which the refractive index gradually varies along its transverse cross-section from the center towards the periphery, may be formed in glass plate 41 according to a desired pattern of optical lines. Since this optical transmission line is provided with a refractive index distribution similar to the above-referred focussing light propagating body, it is possible to transmit light through this optical transmission line. A wiring plate for use in an optical circuit has thus been provided.

Figure 5:
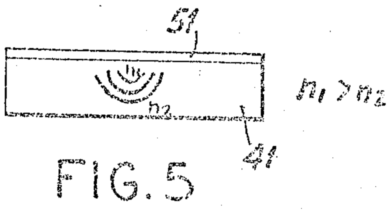

In the embodiment of the invention shown in FIG. 5, after the mask 42 has been removed subsequent to the completion of the first ion exchange illustrated in FIG. 4(*c*), a reflective mirro surface 51 may be formed on the surface of plate 41 without employing the second ion exchange step as illustrated in FIG. 4(*d*).

In order to form reflective mirror surface 51, a glass plate having a different refractive index, a metallic reflective film, a dielectric multi-layer film or the like may be joined onto the surface of glass plate 41. According to the embodiment illustrated in FIG. 5, although the refractive index gradient is not provided in proximity to the surface of the glass plate differently from the optical transmission line as in the embodiment of FIG. 4, it can achieve transmission of light sufficiently similarly to the case of the embodiment of FIG. 1.

While the invention has been described with respect to the embodiments specifically disclosed in connection with the use of glass as the transparent dielectric body, the invention can also be realized by the use of synthetic resin.

For instance, it has been proposed to make a light propagating body having a characteristic feature that the refractive index varies gradually from the center axis towards the periphery, by means of synthetic resin. More particularly, a synthetic resin body having bridges due to the ionic bonds between carboxyl groups and metals may be brought in contact with the ions of a metal other than these metals. The ions of the first-mentioned metals in the synthetic resin body in the proximity of the contact surface are replaced by the ions of the other metal, and the concentration ratio between the two or more kinds of metallic ions contained in the synthetic resin body varies from the center towards the surface, whereby the refractive index of the body may be varied from the center towards the surface.

Although monovalent metals are preferable as the metal ions, all metals can be utilized. In the event that the metallic ions contained in the synthetic resin body through the ion exchange process has a larger ionic polarizability per unit volume than the metallic ions originally contained in the synthetic resin body, the refractive index would decrease from the surface of the synthetic resin body towards its inner portion. On the other hand, in the event that the metallic ions originally contained in the synthetic resin body has a larger ionic polarizability per unit volume, then the refractive index would decrease from the inner portion of the synthetic resin body towards its surface. It is believed that this construction brings about the same results as the ion exchange in the use of glass, as exemplified in the embodiments of the invention herein disclosed.

Therefore, in the embodiments illustrated in FIGS. 1 to 5, if a synthetic resin body is used in place of the glass plate, if a salt of metallic positive ions having an ionic polarizability per unit volume different from the metallic positive ions contained in the synthetic resin body is brought in contact with the synthetic resin plate according to the embodiments illustrated in FIGS. 1 to 5 to carry out ion exchange, and if the other working steps are carried out similarly to the cases of the above-mentioned embodiments, then printed types of optical circuits comprising a syntheic resin plate corresponding to the respective embodiments would be obtained. In this connection, in the aforementioned embodiments, it is, of course, necessary that the initially prepared transparent dielectric body (a glass plate, a synthetic resin plate, and the like) have a uniform refractive index.

In addition, while in the above-described respective embodiments, illustration is made with respect to the case where only an optical line or lines are formed on a single dielectric plate, a printed type of optical circuit simultaneously provided with an electric circuit fabricated by known printed circuit techniques may also be obtained according to the present invention.

Thus while the invention has been herein described with respect to several of its embodiments, it is believed apparent that modifications may be made therein without departing from the spirit and scope of the invention.

I claim:

1. A method for making a desired pattern of optical lines in a dielectric body, each of the optical lines extending along a surface of the body, said method comprising the steps of preparing a planar transparent dielectric body containing at least one kind of metallic positive ions and having a uniform refractive index, forming a desired mask pattern on one surface of said transparent dielectric body, bringing a salt of metallic positive ions having a larger ionic polarizability per unit volume than the metallic positive ion contained in said dielectric body in contact with said transparent dielectric body through said mask to carry out a first ion exchange operation, thereafter removing said mask, and then bringing a salt of metallic ions having a smaller ionic polarizability per unit volume than the metallic positive ion used in the preceding ion exchange operation in contact with the surface of said dielectric body to carry out a second ion exchange operation, thereby to provide elongated regions having lateral cross-sections in which the refractive index varies gradually from one point to the surroundings in cooperation with the first ion exchanged region, said elongated regions providing said optical lines.

2. The method of claim 1, in which said preparing step of said transparent dielectric body includes the step of introducing into said dielectric body at least one modifying oxide.

3. The method of claim 2, in which said modifying oxide is selected from the group consisting of $LiO_2$, $Na_2O$, $K_2O$, $Rb_2O$, $Cs_2O$, $Tl_2O_1$, $Au_2O$, $Ag_2O$, $Ca_2O$, MgO, CaO, BaO, ZnO, CdO, PbO, $SnO_2$ and $La_2O_3$.

4. A method for making a desired pattern of optical lines in a dielectric body, each of the optical lines extending along a surface of the body, said method comprising the steps of preparing a planar transparent dielectric body containing at least one kind of metallic positive ions and having a uniform refractive index, forming a desired mask pattern on one surface of said transparent dielectric body, etching the part of said dielectric body exposed through said mask to a predetermined depth to form a predetermined pattern of elongated ridge portions on the surface of said dielectric body, thereafter removing said mask, and then bringing a salt of metallic positive ions having a different ionic polarizability per unit volume than the metallic positive ion contained in said dielectric body in contact with at least the surface portion corresponding to said ridge portion among the peripheral surface of said ridge portion and the surface opposite to the surface having said ridge portion to thereby perform ion exchange, thereby to develop a variation of refractive index in the lateral cross-section of each of said elongated ridge portions such that the refractive index varies gradually from one point in the section to its surroundings, said elongated ridge portions having the variation of refractive index providing the optical lines.

5. The method of claim 4, in which said preparing step of said transparent dielectric body includes the step of introducing into said dielectric body at least one modifying oxide.

6. A method for making a desired pattern of optical lines in a dielectric body, each of the optical lines extending along a surface of the body, said method comprising the steps of preparing a planar transparent dielectric body containing at least one kind of metallic positive ions, forming a desired mask pattern on one surface of said transparent dielectric body, bringing a salt of metallic positive ions having a different ionic polarizability per unit volume than the metallic positive ion contained in said dielectric body in contact with said dielectric body through said mask to carry out ion exchange, thereby to develop elongated regions having lateral cross-section in which the refractive index varies gradually from a point on the body surface to the interior of the body, thereafter removing said mask, and then joining an additional body onto the entire surface of said dielectric body after the mask has been removed therefrom to define said elongated regions as the optical lines.

7. The method of claim 6, in which the ionic polarizability per unit volume of said salt is greater than the metallic positive ion in said dielectric body.

8. The method of claim 6, in which the ionic polarizability per unit volume of said salt is less than the metallic positive ion in said dielectric body.

9. The method of claim 6, in which said preparing step of said transparent dielectric body includes the step of introducing into said dielectric body at least one modifying oxide.

10. The method of claim 9, in which said modifying oxide is selected from the group consisting of $LiO_2$, $Na_2O$, $K_2O$, $Rb_2O$, $Cs_2O$, $Tl_2O_1$, $Au_2O$, $Ag_2O$, $Ca_2O$, MgO, CaO, BaO, ZnO, CdO, PbO, $SnO_2$ and $La_2O_3$.

References Cited

UNITED STATES PATENTS

| | | | |
|---|---|---|---|
| 3,542,536 | 11/1970 | Flam et al. | 65—4 X |
| 1,592,429 | 7/1926 | Kraus | 65 Dig. 2 |
| 3,625,686 | 12/1971 | Kitano | 65—Dig. 7 |
| 3,083,123 | 3/1963 | Navias | 65—Dig. 7 |
| 3,582,297 | 6/1971 | Lakemam | 65—4 |
| 3,320,114 | 5/1967 | Schulz | 65—30 X |
| 3,563,057 | 2/1971 | Rusembauer | 65—30 |
| 3,573,948 | 4/1971 | Tarnopol | 65—30 X |
| 3,647,406 | 3/1922 | Fisher | 65—30 |
| 3,486,808 | 12/1969 | Hamblen | 65—30 |
| 3,395,366 | 7/1968 | Snitzer et al. | 65—Dig. 7 |
| 3,556,640 | 1/1971 | Austin | 65—Dig. 7 |

FRANK W. MIGA, Primary Examiner

U.S. Cl. X.R.

65—31, 60, Dig. 7